(12) United States Patent
Hattori (10) Patent No.: US 6,438,531 B1
(45) Date of Patent: Aug. 20, 2002

(54) REFERENCE PATTERN PRODUCING APPARATUS WITH CONTROLLED CONTRIBUTION OF LEARNING COEFFICIENTS

(75) Inventor: Hiroaki Hattori, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/399,699

(22) Filed: Sep. 21, 1999

(30) Foreign Application Priority Data

Sep. 24, 1998 (JP) ............................................. 10-287320

(51) Int. Cl.[7] ................................................ G06N 3/02
(52) U.S. Cl. ................................. 706/12; 700/28; 703/6
(58) Field of Search ............................ 706/12; 700/28; 703/6

(56) References Cited

U.S. PATENT DOCUMENTS 6,004,015 A * 12/1999 Watanabe et al. .............. 700/28
6,148,274 A * 11/2000 Watanabe et al. .............. 703/6

FOREIGN PATENT DOCUMENTS

| JP | 4-354049 | 12/1992 |
| JP | 9-160586 | 6/1997 |
| JP | 2701500 | 10/1997 |

OTHER PUBLICATIONS

Takara, T.; Higa, K; Nagayama, I., Isolated word recognition using the HMM structure selected by the genetic algorithm, Acoustics, Speech, and Signal Processsing, 1997. ICASSP–97., 1997 IEEE International Conference on, vol.: 2, Apr. 21–24, 1997, Page(s.*

Byoung–Tak Zhang; Paass, G.; Muhlenbein, H., Convergence properties of incremental Bayesian evolutionary algorithms with single Markov chains, Evolutionary Computation, 2000. Proceedings of the 2000 Congress on, vol.: 2, Jul. 16–19, 2000, pp.: 938–994.*

P. Larrañaga, M. Y. Gallego, B. Sierra, L. Urkola, M. J. Michelena, Bayesian networks, rule induction and logistic regression in the prediction of women suffering from breast cancer, 8th Portuguese Conference on Artificial Intelligence.*

Hurui, "Digital Speech Processing", published from Tokai University publication meeting.

S. Nakagawa, "Speech Recognition Algorithm in HMM Method" of "Speech Recognition by Stochatic Model" published from Corona Company.

* cited by examiner

Primary Examiner—Wilbert L. Starks, Jr.
(74) Attorney, Agent, or Firm—Dickstein, Shapiro, Morin & Oshinsky, LLP

(57) ABSTRACT

A reference pattern producing apparatus includes a data storage section, a learning coefficient storage section and a reference pattern producing section. The data storage section stores learning data of a content and a time series of features for each of a plurality of samples groups. The learning coefficient storage section stores learning coefficients to the plurality of sample groups. The reference pattern producing section repetitively learns the learning data using the learning coefficients to produce reference patterns.

20 Claims, 9 Drawing Sheets

REFERENCE PATTERN PRODUCING APPARATUS WITH CONTROLLED CONTRIBUTION OF LEARNING COEFFICIENTS

BACKGROUND OF THE INVENTION

1. Field of the Invention

The present invention relates to a reference pattern producing apparatus, and more particularly to a reference pattern producing apparatus with a controlled contribution of learning coefficients.

2. Description of the Related Art

In recent years, a speech recognition apparatus is known in which a speaker independent reference pattern is produced from a time series of features of speech uttered from each of a plurality of speakers. In this case, the Hidden Markov model (HMM) is widely used for the modeling of acoustic features. The Hidden Markov model has advantages in stochastic description of the fluctuation of speech and a good affinity with a probability statistic language model such as a bigram, because it is a statistical model.

The learning in the Hidden Markov model is carried out based on a learning algorithm called Baum-Welch (or Forward-Backward) algorithm. This algorithm includes a step of determining an expectation (Expectation step) and a step of maximizing the expectation (Maxmization step) which are alternately repeated. Thus, the algorithm is also called an EM algorithm.

Figure 1:
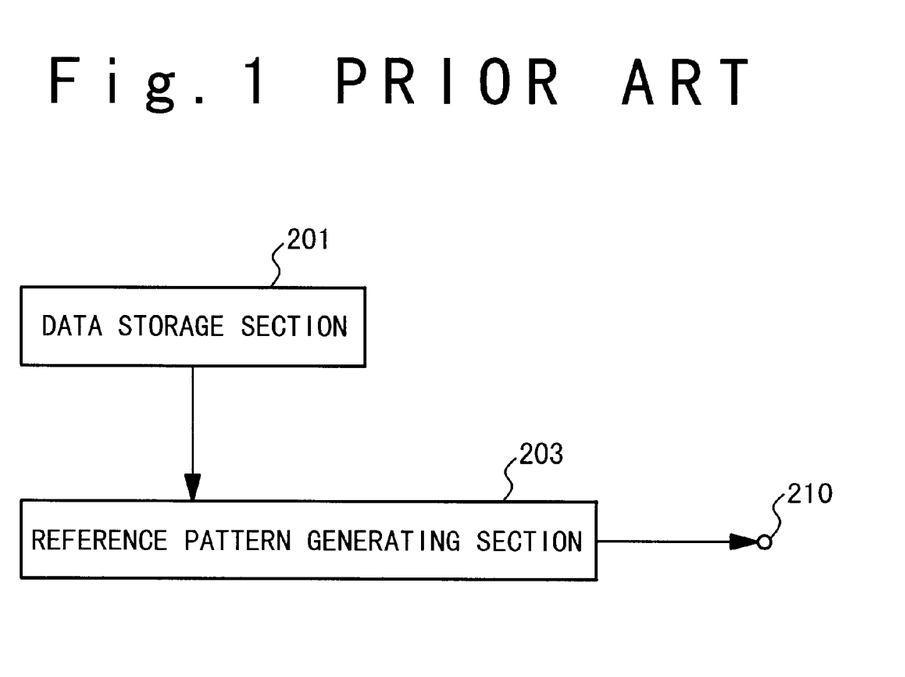
FIG. 1 is a block diagram showing the structure of a conventional example of a reference pattern learning apparatus.

FIG. 1 is a block diagram showing the structure of a conventional learning apparatus for the EM algorithm. Samples for the learning are stored in a data storage section 201. A reference pattern producing section 203 produces and outputs reference patterns using the samples, to an output terminal 210. For example, a specific algorithm is described in detail in the third chapter "Speech Recognition Algorithm in HMM Method" of "Speech Recognition by Stochastic Model" published from corona company by Seiichi NAKAGAWA.

An actual learning example will be described below.

Figure 5:
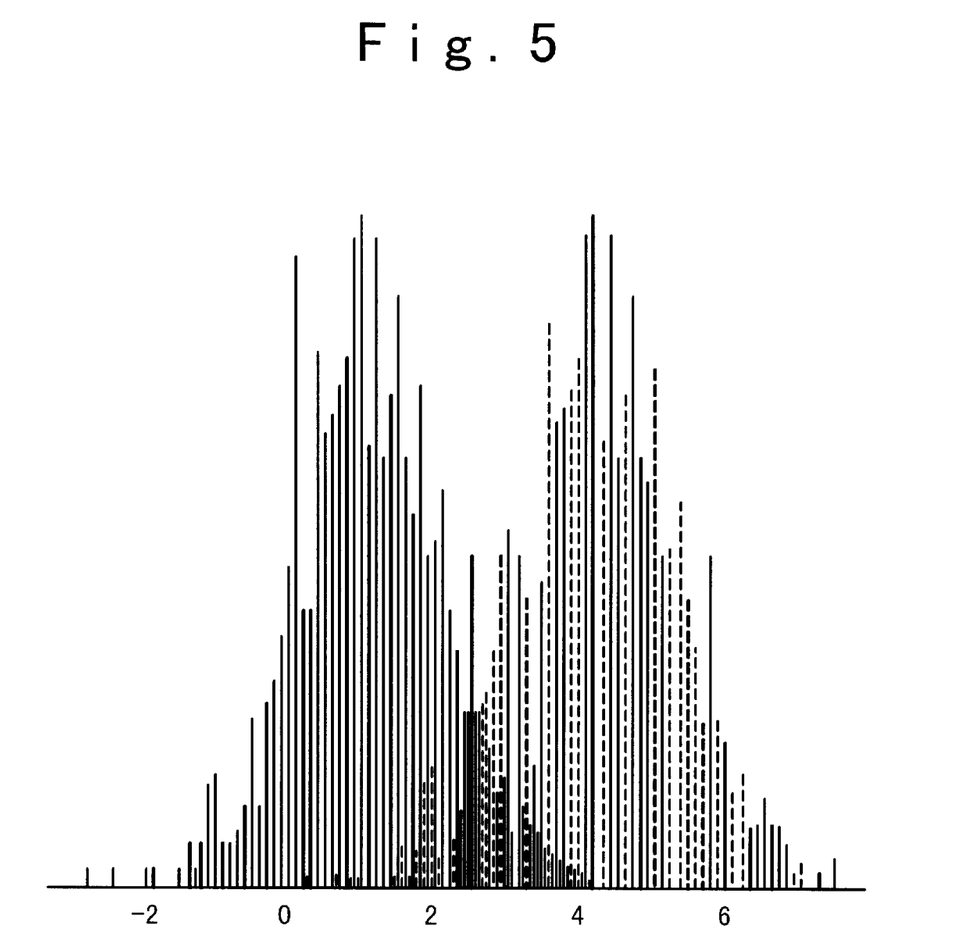
FIG. 5 is a diagram showing the histogram when samples are equally extracted from two Gaussian distributions $N(1.0, 1.0)$ and $N(4.0, 1.0)$.
Figure 6:
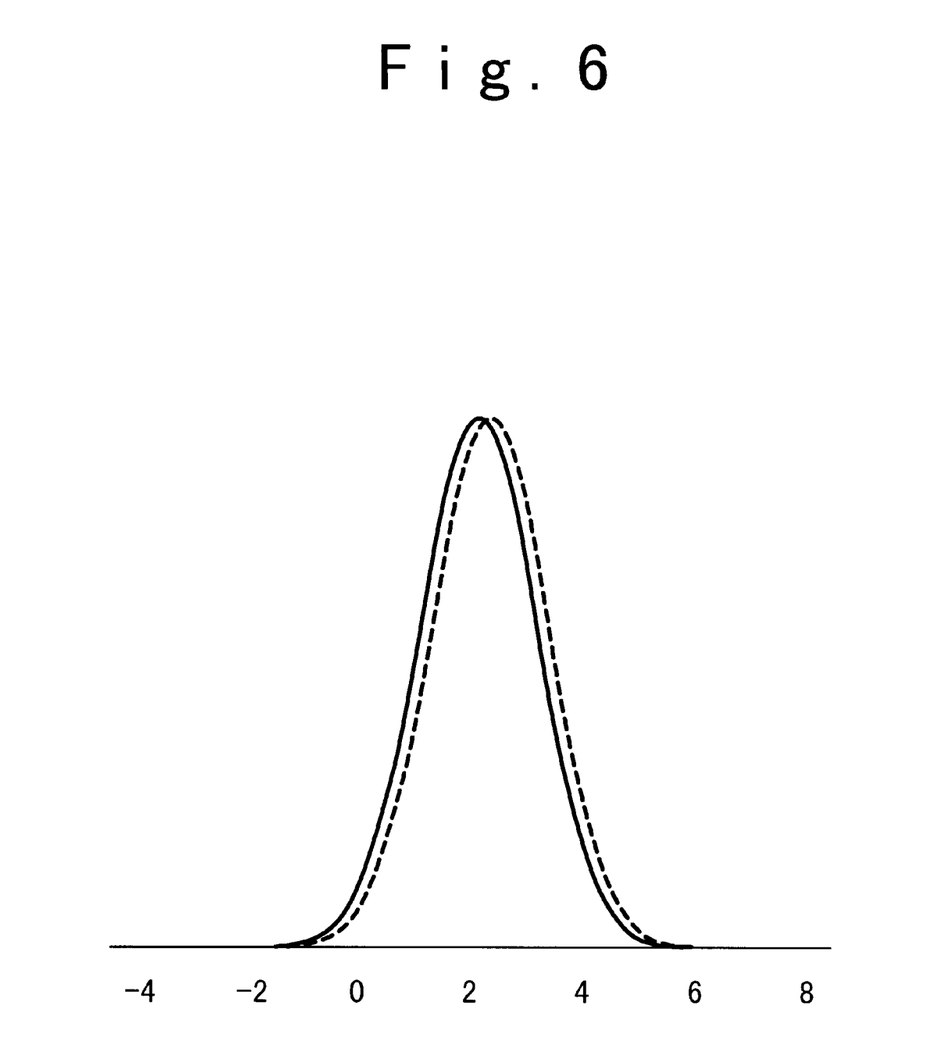
FIG. 6 is a diagram showing initial distributions of an EM algorithm.
Figure 7:
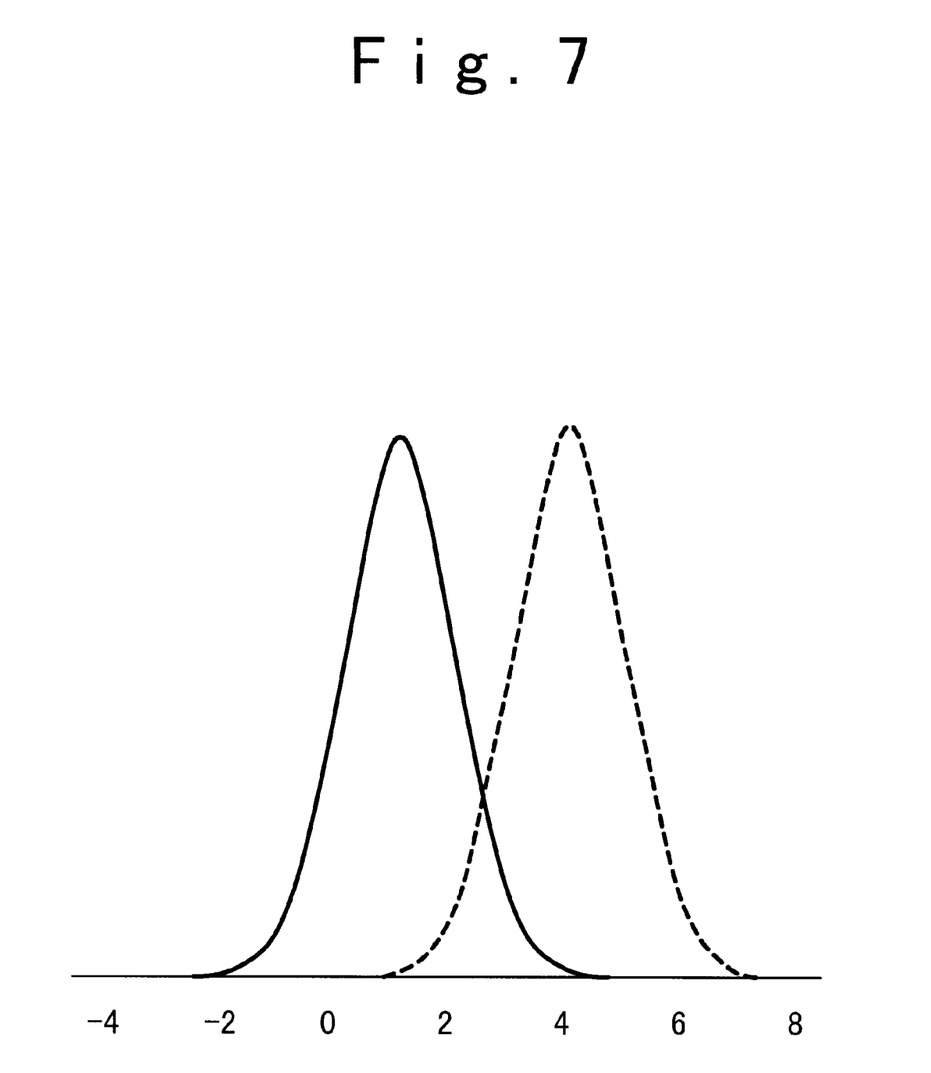
FIG. 7 is a diagram showing an example that two Gaussian distributions are right estimated based on the EM algorithm.

FIG. 5 shows the histograms when 1000 samples are extracted from each of two Gaussian distributions N(1.0, 1.0) and N(4.0,1.0). FIG. 6 shows initial distributions given to the EM algorithm. In the EM algorithm, the update of an average, a variance, mixture coefficients is repeated based on the initial distributions. FIG. 7 shows distributions obtained after the repetitive learning process of 500 times. It could be understood that the two Gaussian distributions are correctly estimated through the EM algorithm.

Figure 8:
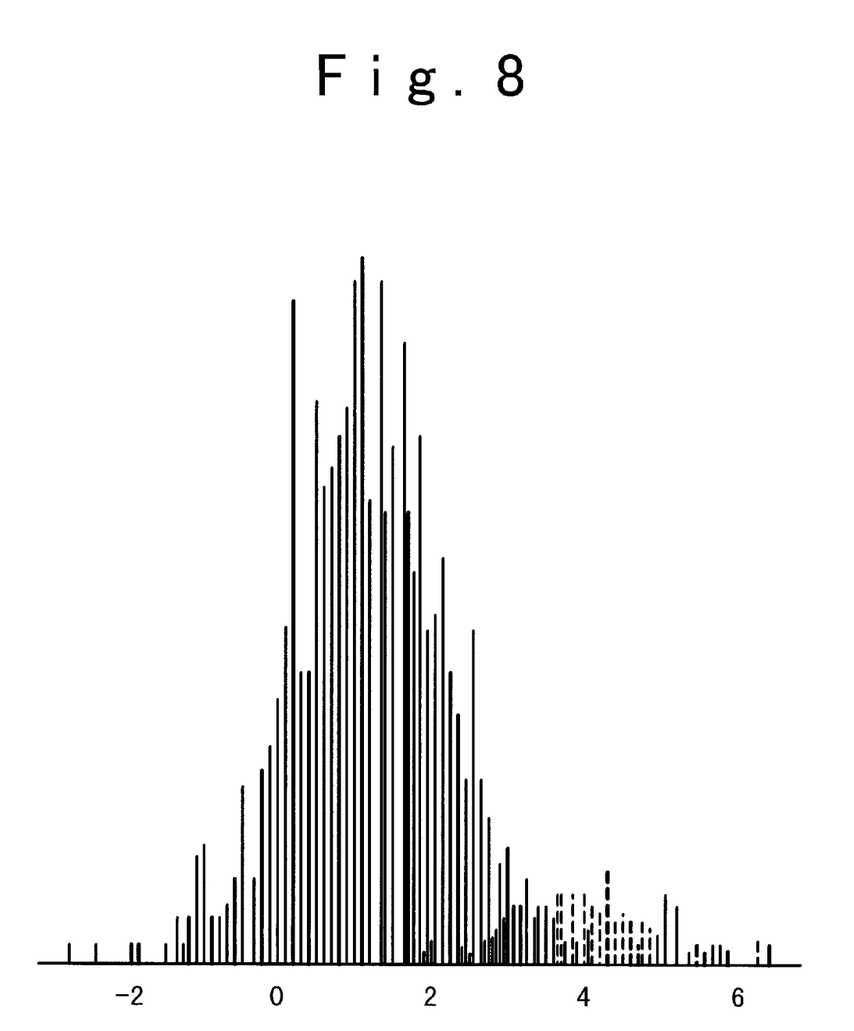
FIG. 8 is a diagram showing the histograms when samples are unequally extracted from the two Gaussian distributions $N(1.0, 1.0)$ and $N(4.0, 1.0)$.
Figure 9:
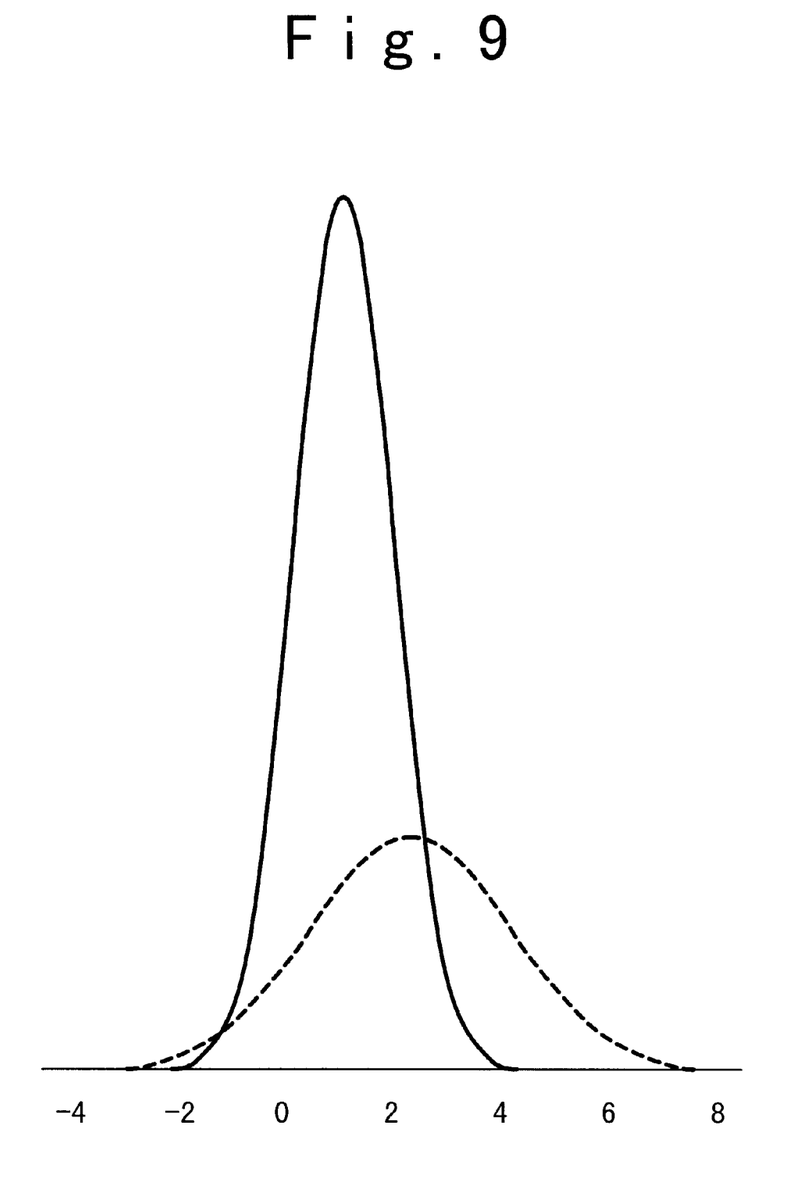
FIG. 9 is a diagram showing an example that the two Gaussian distributions are not right estimated based on the EM algorithm.

FIG. 8 shows the histograms obtained from the Gaussian distributions shown in FIG. 5. In this case, samples obtained from one of the two Gaussian distributions are about 1/10 of samples obtained from the other distribution. In the same way as the above example, when the Gaussian distributions of FIG. 6 are given to these sample groups as the initial distributions, the distributions are estimated, as shown in FIG. 9. In this example, the estimation of the distribution for the small number of samples is not correctly carried out because an objective function of the learning algorithm is defined to the whole of the learning samples.

Therefore, when the number of samples in one of the distributions is insufficient, an error is derived in the distribution estimation on the side of the less samples due to the influence on the side of many samples. For this reason, the collection of the learning samples is carried out in the learning step of HMM such that the numbers of samples are equal to each other for respective distributions. For example, when the learning is carried out using the learning data of men and women, it is desirable that the numbers of samples for the men and the women are approximately equal.

The same problem would be caused when contribution of a distribution to be optimized to an objective function or algorithm is constant regardless of learning data in an algorithm such as the EM algorithm.

Conventional techniques for compensating degradation of estimation precision due to a lack of learning samples are described in Japanese Patent No. 2,701,500 (corresponding to Japanese Laid Open Patent Application (JP-A-Heisei 3-212696) and Japanese Laid Open Patent Application (JP-A-Heisei 9-160586).

In the technique described in Japanese Patent No. 2701500, an acoustic model (speaker independent model) has been made to learn based on learning data uttered from a plurality of speakers and then is made to adapt to a specific speaker using a small amount of learning data uttered from that specific speaker. In this case, parameters having large dependency on the speaker are determined based on a ratio of a variance between speakers to a variance for the speaker in feature parameters. Then, the adaptation to the specific speaker is carried mainly for the parameters. Thus, the acoustic model is produced to be adaptive for the specific speaker with good precision based on a small amount of data. However, even when this technique is used, when the precision of the speaker independent model is degraded due to the lack of learning samples, the adaptation for the speaker is carried out based on the unsuitable variance. Therefore, the above problem remains.

The technique described in Japanese Laid Open Patent Application (JP-A-Heisei 9-160586) is as follows. The constraint of phonemic environment is lessened for an acoustic model with a small amount of learning samples to increase the learning samples. By linearly combining the acoustic mode and a learned mode (environment dependence type model), the parameters of the model are smoothed so that the stabilization of the parameter estimation will be accomplished. Thus, this method is aimed at improvement of the estimation precision in the learning algorithm.

Also, a learning system for pattern recognition is described in Japanese Laid Open Patent Application (JP-A-Heisei 4-354049). In this reference, a recognition rate and a summation of values p indicative of a ratio of likelihood $r_{pt}$ and a likelihood $r_{pt}'$ between elements having values approximate to a likelihood $r_{pq}$ in each set are used as a function for estimating a learning result. In this learning system of pattern recognition, a feeding-back loop is adopted in which a learning coefficient C(R) is changed when the current estimation result is degraded more than the previous estimation result. The processing procedure is composed of a distinguishing process, an estimating process of a reference vector, a re-estimating process of the reference vector, a resetting process of the learning coefficient and a learning process. In this way, a reference pattern can be produced such that a recognition rate $R_r$ becomes maximum which is obtained when an unknown set T is recognized based on an optimal reference pattern to the unknown set, i.e., the reference pattern determined from a known set S. In this reference, the influence of unbalance in the number of learning samples cannot be avoided.

SUMMARY OF THE INVENTION

Therefore, an object of the present invention is to provide a reference pattern producing apparatus in which the degradation of the estimation precision in a learning algorithm due to disproportionality in the number of samples between populations can be prevented by controlling the contribution of samples belonging to each population to the learning algorithm.

In order to achieve an aspect of the present invention, a reference pattern producing apparatus includes a data storage section, a learning coefficient storage section and a reference pattern producing section. The data storage section stores learning data of a content and a time series of features for each of a plurality of samples groups. The learning coefficient storage section stores learning coefficients corresponding to each of the plurality of sample groups. The reference pattern producing section repetitively learns the learning data using the learning coefficients to produce reference patterns.

Each learning coefficient may be determined based on a size of a corresponding one of the plurality of sample groups. In this case, a product of a number of samples in each of the plurality of sample groups and a corresponding one of the learning coefficients is the same over the plurality of sample groups.

In order to achieve another aspect of the present invention, a method of producing reference patterns includes:

learning a learning data of a content and a time series of features for each of a plurality of samples groups using learning coefficients corresponding to the plurality of sample groups;

repeating the learning until a predetermined condition is met; and outputting reference patterns when the predetermined condition is met.

In order to achieve still another aspect of the present invention, a reference pattern producing apparatus includes a data storage section a learning coefficient storage section, a reference pattern producing section, a learning coefficient updating section and a control section. The data storage section stores learning data of a content and a time series of features for each of a plurality of groups of samples. The learning coefficient storage section stores learning coefficients corresponding to each of the plurality of groups of samples. The reference pattern producing section learns the learning data using the learning coefficients to produce reference patterns. The learning coefficient updating section determines measures of fitness between each of the samples and a corresponding one of the produced reference patterns, and updates the learning coefficients based on the determined measures of fitness. The control section repetitively controls the reference pattern producing section and the learning coefficient updating section until a predetermined condition is met, and outputs the produced reference patterns when the predetermined condition is met.

Each of the measures of fitness may be a likelihood between each of the samples and a corresponding one of the produced reference patterns. Also, each of the measures of fitness may be a recognition rate between each of the samples and a corresponding one of the produced reference patterns.

The learning coefficient updating section updates the learning coefficients based on the determined measures of fitness such that contribution, to an objective function or learning algorithm, of the learning coefficients for the measures of fitness larger than an average of measures of fitness is made small and such that contribution, to the objective function, of the learning coefficients for the measures of fitness smaller than the average of measures of fitness is made larger.

Also, the predetermined condition may be a predetermined number of times of the update of the learning coefficients. Instead, the predetermined condition may be that an update quantity of any of the learning coefficients is less than a predetermined value.

In order to achieve yet still another aspect of the present invention, a method of producing reference pattern includes:

performing learning of learning data using learning coefficients to a plurality of groups of samples to produce reference patterns, the learning data being composed of a content and a time series of features for each of the plurality of groups of samples;

determining measures of fitness between each of the samples and a corresponding one of the produced reference patterns;

updating the learning coefficients based on the determined measures of fitness;

repetitively executing the performing, the determining and the updating; and outputting the produced reference patterns when the predetermined condition is met.

DESCRIPTION OF THE PREFERRED EMBODIMENTS

A reference pattern producing apparatus of the present invention will be described below in detail with reference to the attached drawings.

Figure 2:
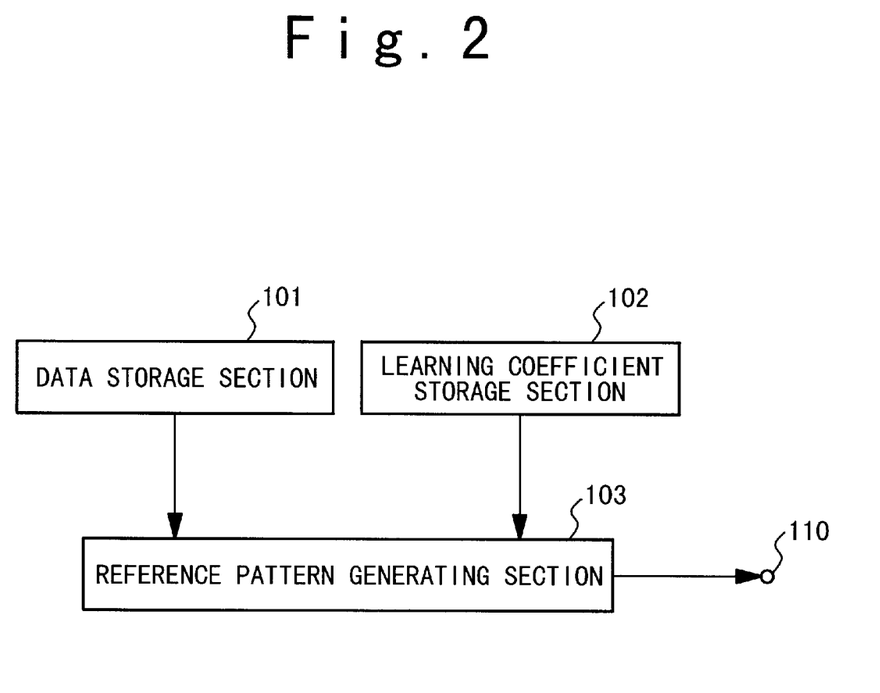
FIG. 2 is a block diagram showing the structure of a reference pattern learning apparatus according to a first embodiment of the present invention.

FIG. 2 is a block diagram showing the structure of a reference pattern learning apparatus according to the first embodiment of the present invention. Referring to FIG. 2, the reference pattern learning apparatus of this embodiment is composed of a data storage section 101, a learning coefficient storage section 102 and a reference pattern producing section 103 as a main body. It should be noted that when the reference pattern learning apparatus in the first embodiment is realized by a general computer, the data storage section 101 and the learning coefficient storage section 102 are formed by a magnetic disk unit and a main memory. The reference pattern producing section 103 is composed of a software program executed by a CPU and the CPU.

A feature vector series of and the speech content uttered from each of a plurality of speakers are stored in the data storage section 101. As the feature vector series, for example, cepstrum, LPC coefficient, and these time variations obtained by FFT analysis and linear estimate analysis are available, as described in "Digital Speech Processing" by HURUI (published from Tokai university publication meeting). Also, as the speech content, the reading notion by which it is possible to form an acoustic model series which is coincident with the speech content is available. It should be noted that a speaker number and an utterance number are given to every set of one feature vector series and the speech content in the data storage section 101.

A previously set learning coefficient of each speaker is stored in the learning coefficient storage section 102. As the learning coefficient, when the number of samples for a population to which a speaker i belongs is Ni, the learning coefficient of the speaker i is set to be (a predetermined value)/Ni. In this case, the product of the learning coefficient for each speaker and the number of the samples for the population to which the speaker belongs is the same over all the populations, and the product value is a predetermined constant.

When the learning coefficient of the speaker that belongs to one population is made larger than that of the speaker that belongs to another population, the reference pattern can be produced to reflect the feature vector series of the population. It should be noted that a speaker number is given to every learning coefficient of each speaker in the learning coefficient storage section 102.

In the first embodiment, the contribution of samples belonging to a population to a learning algorithm is controlled to improve the estimation precision of the population from which only a small number of samples is obtained.

A case of learning of the mixture coefficients ci (i=1, 2) in the 2 mixture Gaussian distributions in the above mentioned EM algorithm is supposed. In this case, the probability $Pr(y|\lambda)$ that a sample y is formed from a model $\lambda$ is given as follows from two Gaussian distributions $N(\mu i, \sigma i)$ (i=1, 2).

$$Pr(y|\lambda) = \sum_{i=1}^{2} Ci * Pr(y | N(\mu i, \sigma i))$$

Supposing that learning sample groups xj (j=1 to N) are given, an updated value c'i of the mixture coefficient ci by the EM algorithm is given as follows.

$$c'i = \frac{\sum_{j=1}^{N} \gamma(i, j)}{\sum_{j=1}^{N} \sum_{i=1}^{2} \gamma(i, j)}$$

where $\gamma(i, j)$ is a probability that a sample xj is generated from the Gaussian distributions $N(\mu i, \sigma i)$.

Then, a new learning coefficient wj is introduced to control the contribution of the sample xj to the learning algorithm or the reference pattern and the updating operation is carried out in accordance with the following equation.

$$c'i = \frac{\sum_{j=1}^{N} wj * \gamma(i, j)}{\sum_{j=1}^{N} \sum_{i=1}^{2} wj * \gamma(i, j)}$$

As understood from the above equation, when wj is a constant value (j=1 to N), the equation is he same as a usual learning algorithm. However, when wj>wk, the contribution of the sample xj to the algorithm becomes larger than the contribution of the sample xk to the algorithm. Therefore, a larger learning coefficient is given to the samples from the population from which only the small number of samples is obtained. As a result, contribution for the parameter updating is increased. In this way, the same effect is attained as having a large number of samples obtained from a population.

The reference pattern producing section 103 reads out the feature vector series and the speech content of each speaker from the data storage section 101, and the learning coefficient of each speaker from the learning coefficient storage section 102. Also, the reference pattern producing section 103 carries out the learning while controlling contribution of samples to the algorithm or the reference pattern, and outputs a reference pattern to a terminal 110. The method of controlling contribution depends on the reference pattern learning algorithm. For example, if the mixing coefficient c'i of the 2 mixing Gaussian distributions in the EM algorithm is estimated, when the learning coefficient wj is given to the speaker xj, the learning is carried out as $$c'i = \frac{\sum_{j=1}^{N} wj * \gamma(i, j)}{\sum_{j=1}^{N} \sum_{i=1}^{2} wj * \gamma(i, j)}$$

where $\gamma(i, j)$ is a probability that a sample xj is formed from the Gaussian distributions $N(\mu i, \sigma i)$.

Hereinafter, the processing of the reference pattern producing section 103 will be described in detail. The learning samples xj{j=1 to N} used for the learning belong to populations kj{kj =1 or 2, j=1–N}, respectively. The number of samples Nk{k=1 or 2} which belong to each population is known. In this as, example the learning process is composed of:

1) The learning coefficient wj of each learning sample meets the equation wj=1.0/(Nkj).
2) Initial values of a mixing coefficient ci, an average $\mu i$, and a variance $\sigma i2$ are set. For example, using the average $\mu$ of all the samples, and the variance $\sigma 2$ and a small value $\epsilon$, the initial values are set as follows:
3) The mixing coefficient ci, the average $\mu i$, and the variance $\sigma i2$ are updated using the following estimation.

$$c'i = \frac{\sum_{j=1}^{N} wj * \gamma(i, j)}{\sum_{j=1}^{N} \sum_{i=1}^{2} wj * \gamma(i, j)}$$

-continued $$\mu i = \frac{\sum_{j=1}^{N} wj * \gamma(i,j) * xj}{\sum_{j=1}^{N}\sum_{i=1}^{2} wj * \gamma(i,j)}$$

$$\sigma i^2 = \frac{\sum_{j=1}^{N} wj * \gamma(i,j) * (xj - \mu i)^2}{\sum_{j=1}^{N}\sum_{i=1}^{2} wj * \gamma(i,j)}$$

where $\gamma(i, j)$ is the probability that the sample xj is formed from the Gaussian distributions $N(\mu i, \sigma i)$.

4) Until the learning converges, the step 3) is repeated.

Figure 4:
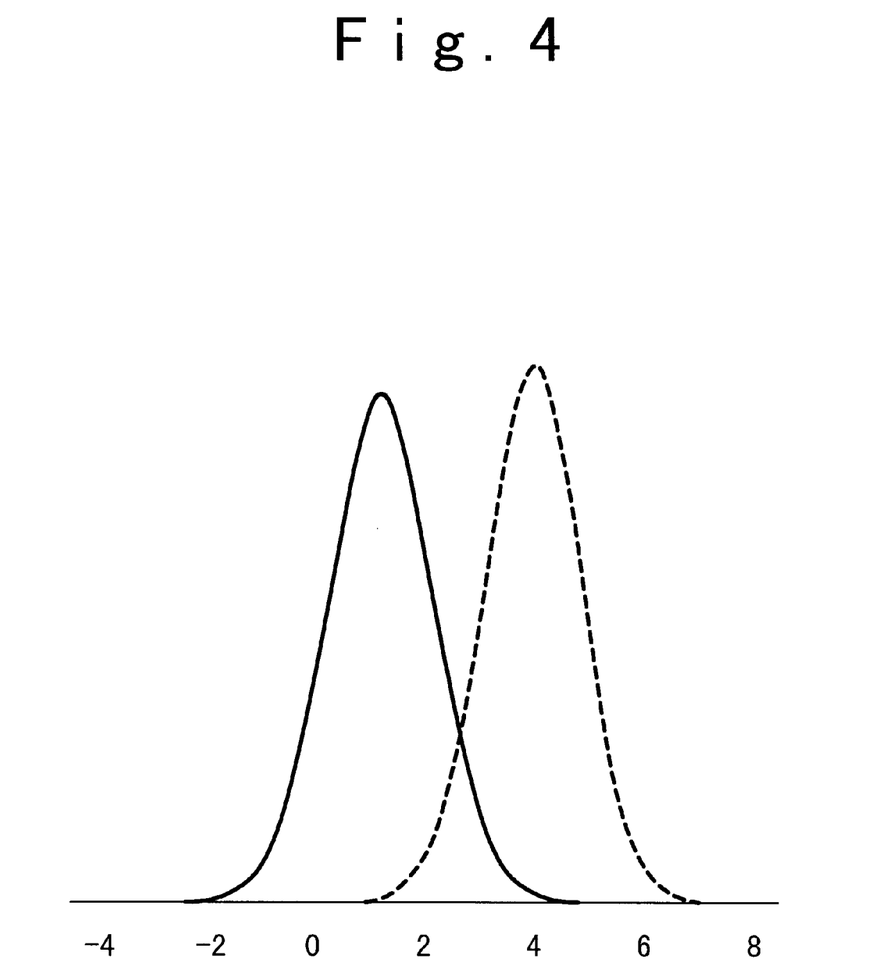
FIG. 4 is a diagram showing the effect when contribution of each speaker to the feature in learning data is controlled using a learning coefficient.

FIG. 4 shows the estimation result when the learning coefficients are provided such that one of the learning coefficients is 10 times larger than the other of the learning coefficients. That is, the products of the number of samples and learning (weight) coefficients are equal to each other between the two groups or populations. As seen from FIG. 4, an average and variance of the population are approximately estimated right.

Since the number of samples is not increased, the estimation precision itself of the statistic of the population is not improved. The present invention improves the degradation of the estimation precision due to the unbalance in the number of samples between the populations. In order to estimate the statistic of each population with a good precision, enough samples are needed for each population.

Figure 3:
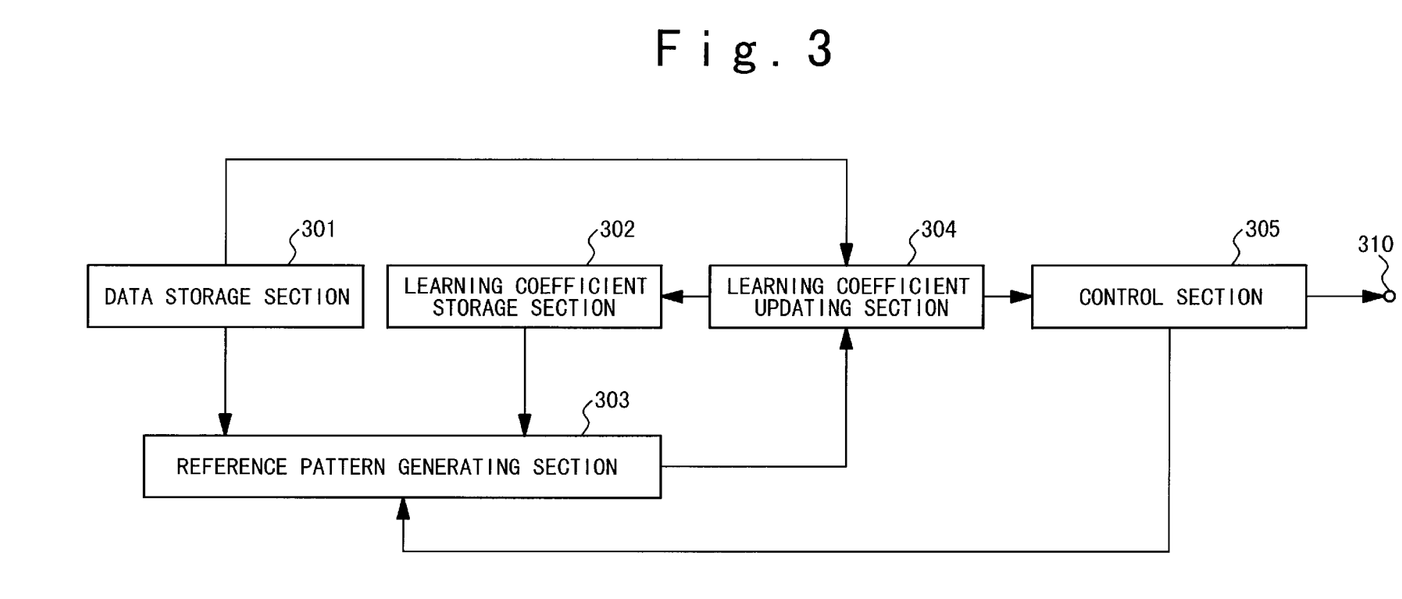
FIG. 3 is a block diagram showing the structure of the reference pattern learning apparatus according to a second embodiment of the present invention.

FIG. 3 is a block diagram of the structure of the reference pattern learning apparatus according to the second embodiment of the present invention. Referring to FIG. 3, the reference pattern learning apparatus in the second embodiment is composed of a data storage section 301, a learning coefficient storage section 302, a reference pattern producing section 303, a learning coefficient updating section 304 and a control unit 305 as a main body. It should be noted that when the reference pattern learning apparatus in the second embodiment is realized with a general-purpose computer, the data storage section 301 and the learning coefficient storage section 302 are composed of a magnetic disk unit and a main memory. The reference pattern producing section 303, the learning coefficient updating section 304 and the control unit 305 are accomplished by a software program which is executed by a CPU and the CPU.

In the first embodiment, the learning data or samples are separated into two groups such that each of the two groups belongs to one population and such that contributions of the respective groups become equal to each other. When the population can be defined, for example, when it is proved previously that samples contained in the learning data belong to the population of men, women, children, or old person, the same method as mentioned above can be used.

However, the population to which samples belong can not always be pre-determined. In other words, samples contained in the learning data may be obtained from a speaker from which it is not known whether the speaker belongs to populations of men, women, children, or old person. In such a case, the population from which only the small number of samples is obtained can not be determined. Therefore, the samples from the population can not be previously given a large learning coefficient. In such a case, it is possible to learn step by step based on the adaptation of each speaker to the model which is obtained from the learning result.

A feature vector series and the speech content uttered from a plurality of speakers are stored in the data storage section 301. As the feature vector series, for example, cepstrum, LPC coefficient, and these time variations obtained by FFT analysis and linear estimate analysis are available, as described in "Digital Speech Processing" by HURUI (published from Tokai university publication meeting). Also, as the speech content, the reading notion by which it is possible to form an acoustic model series or an acoustic model series which is coincident with the speech content is available. It should be noted that a speaker number and an utterance number are given to every set of one feature vector series and of the speech content in the data storage section 301.

An initial value of the learning coefficient of each speaker is stored in the learning coefficient storage section 302. The initial value of the learning coefficient of each speaker may be any value. However, when a population can be previously defined, if the number of samples in the population to which a speaker i belongs is Ni, the initial value of the learning coefficient of speaker i may be set to be (a predetermined value)/Ni, as in the first embodiment shown in FIG. 1. In this case, the product of the learning coefficient of each speaker and the number of the samples in the population to which the speaker belongs is same over all the populations, and the product value is a predetermined constant. In this case, when the learning coefficient of the speaker who belongs to one population is made larger than with that of the speaker who belongs to another population, the reference pattern can be produced more to reflect a feature of the population. It should be noted that a speaker number is given to every learning coefficient of each speaker in the learning coefficient storage section 302.

The reference pattern producing section 303 reads out the feature vector series and the speech content of each speaker from the data storage section 301, and the learning coefficient of each speaker from the learning coefficient storage section 302. Also, the reference pattern producing section 303 carries out the learning while controlling contribution to the reference pattern of each speaker, and outputs a reference pattern to the learning coefficient updating section 304. The method of controlling contribution depends on the reference pattern learning algorithm. For example, if the mixing coefficient c'i of the 2 mixing Gaussian distribution in the EM algorithm is estimated, when the learning coefficient wj is given to the speaker xj, the learning is carried out as:

$$c'i = \frac{\sum_{j=1}^{N} wj * \gamma(i,j)}{\sum_{j=1}^{N}\sum_{i=1}^{2} wj * \gamma(i,j)}$$

where $\gamma(i, j)$ is a probability that a sample xj is formed from the Gaussian distribution $N(\mu i, \sigma i)$. It should be noted that the average $\mu i$ and the variance $\sigma i$ can be learned as in the first embodiment shown in FIG. 1.

The learning coefficient updating section 304 receives a reference pattern produced by the reference pattern producing section 303. The updating section 304 finds a measure of fitness such as the recognition rate and the degree of similarity indicative of the degrees of the adaptation with the data stored in the data storage section 301. Then, the updating section 304 changes the learning coefficient for the speaker having a measure of fitness less than an average such that the contribution of the learning coefficient becomes larger, and changes the learning coefficient for the speaker having the measure of fitness more than the above average such that the contribution of the learning coefficient becomes small.

Next, the operation of the reference pattern producing apparatus in the second embodiment will be described below.

In the reference pattern producing apparatus in the second embodiment, the operation procedure is as follows.

1) learning coefficients to samples of all speakers are set to be equal to each other,
2) learning is carried out using the learning coefficient,
3) a measure of fitness indicative of the adaptation of each speaker to the model such as a recognition rate or a degree of similarity of each speaker using the learned model,
4) an average of the measure of fitness for all the speakers is calculated, and the learning coefficient is changed to have large contribution to the sample of the speaker with the measure of fitness which is lower than the average, and to have small contribution to the sample of the speaker which is higher than the average,
5) return to 2), if the learning coefficient is not converged or the predetermined number of times of learning is not carried out.

The increase or decrease in quantity of the learning coefficient is determined based on a preliminary test. As the learning coefficient is made large, the learning speed is generally faster but the convergence is decreased. On the other hand, as the learning coefficient is made small, the learning speed is generally slower but the convergence is increased.

In the above example, the EM algorithm is taken as an example. However, the present invention is not limited to the EM algorithm and can be adaptable to various learning algorithms such as distinguishing learning algorithm and a mutual information quantity algorithm.

Next, the operation procedure of the learning coefficient updating section 304 will be described below.

1) the following degree of similarity is determined as the measure of fitness Lj indicative of the degrees of the adaptation with the reference pattern determined by the reference pattern producing section 303 of each sample xj stored in the data storage section 301.

$$Lj = \log \sum_{i=1}^{2} ci * Pr(xj|N(\mu i, \sigma i))$$

2) Using the obtained measurement of fitness Lj, the learning coefficient updating section 304 updates the learning coefficient wj as follows.
if (Lj<L) then
    wj'=wj+ϵ
    else
    wj'=wj−ϵ
where L is the average of Lj with respect to j and ϵ is a small positive value.

In the above example, the degree of similarity is used because the sample xj of the speaker j is for a single category. However, when there are a plurality of samples containing a plurality of recognition categories as the sample of the speaker j, the recognition rate of the sample of the speaker j may be used as the measure of fitness Lj.

The control unit 305 determines that the ending condition is met when the number of times of the coefficient updating operation in the learning coefficient updating section 304, reaches a predetermined value. Then, the control unit 305 outputs the reference pattern to terminal 310. Otherwise, the control unit 305 controls the reference pattern producing section 303 to produce a reference pattern using the updated learning coefficient.

As the ending condition, various conditions such as the updated quantity of the coefficient which becomes less than a predetermined value, in addition to the number of times of the coefficient updating is available. In this case, the updating quantity of the learning coefficient means the quantity indicative of the difference between the coefficient before the updating operation and the coefficient after the updating operation, and may be the difference and a ratio of them.

According to the present invention, in the case that a speaker independent speech recognition reference pattern is produced from the time series of the features of the speeches uttered from the plurality of speakers, the contribution of the sample which belongs to each population to the learning algorithm is controlled. Thus, the degradation of the estimation precision in the learning algorithm due to the disproportionality of the number of samples between the populations can be improved.

Also, according to the structure in which the learning is progressed based on the quality of the degrees of the adaptation of each speaker to the model obtained as the result of the learning, even if the population to which each sample belongs is not known, the degradation of the estimation precision in the learning algorithm due to the disproportionality of the number of samples between the populations can be improved.

What is claimed is:

1. A reference pattern producing apparatus for improving the estimation precision in a speech recognition learning algorithm, the reference pattern producing apparatus comprising:
    a data storage section storing data having a series of features relating to speech recognition for each of a plurality of sample groups;
    a learning coefficient storage section storing respective learning coefficients for each of said plurality of sample groups; and
    a reference pattern producing section that samples said data using said learning coefficients to produce a respective reference pattern for each of said plurality of sample groups for use in said speech recognition learning algorithm.

2. A reference pattern producing apparatus according to claim 1, wherein each respective learning coefficient is determined based on a size of a corresponding one of said plurality of sample groups.

3. A reference pattern producing apparatus according to claim 2, wherein a product of a number of samples in each of said plurality of sample groups and a corresponding one of said respective learning coefficients are the same over said plurality of sample groups.

4. A method of producing reference patterns for improving the estimation precision in a speech recognition learning algorithm, the method comprising:
    sampling data having a series of features relating to speech recognition for each of a plurality of sample groups using respective learning coefficients corresponding to said plurality of sample groups to produce a respective reference pattern for each of said plurality of sample groups;
    repeating said learning until a predetermined condition is met; and
    outputting at least one said respective reference pattern for use in said speech recognition learning algorithm when said predetermined condition is met.

5. A method according to claim 4, wherein each respective learning coefficient is determined based on a size of a corresponding one of said plurality of sample groups.

6. A method according to claim 5, wherein a product of a number of samples in each of said plurality of sample groups and a corresponding one of said respective learning coefficients are the same over said plurality of sample groups.

7. A reference pattern producing apparatus for improving the estimation precision in a speech recognition learning algorithm, the reference pattern producing apparatus comprising:

a data storage section storing data having a series of features relating to speech recognition for each of a plurality of sample groups;

a learning coefficient storage section storing respective learning coefficients for each of said plurality of sample groups;

a reference pattern producing section that samples said data using said respective learning coefficients to produce a respective reference pattern for each of said plurality of sample groups;

a learning coefficient updating section determining a respective measure of fitness between each of said sample groups and said respective reference pattern for each of said sample groups, and updating said respective learning coefficients based on said respective determined measure of fitness; and a control section repetitively controlling said reference pattern producing section and said learning coefficient updating section until a predetermined condition is met, and outputting at least one said respective reference pattern for use in said speech recognition learning algorithm when said predetermined condition is met.

8. A reference pattern producing apparatus according to claim 7, wherein initial values of said learning coefficients are preset.

9. A reference pattern producing apparatus according to claim 7, wherein each of said respective measure of fitness is determined by a degree of similarity between each of said sample groups and said respective reference pattern for each of said sample groups.

10. A reference pattern producing apparatus according to claim 7, wherein each of said respective measure of fitness is determined by calculating a recognition rate between each of said sample groups and said respective reference pattern for each of said sample groups.

11. A reference pattern producing apparatus according to claim 7, wherein said learning coefficient updating section updates said respective learning coefficients based on said respective determined measure of fitness such that a learning coefficient for a measure of fitness larger than an average measure of fitness is decreased and a learning coefficient for a measure of fitness smaller than said average measure of fitness is increased.

12. A reference pattern producing apparatus according to claim 7, wherein said predetermined condition is met when said respective learning coefficients are updated a set number of times.

13. A reference pattern producing apparatus according to claim 7, wherein said predetermined condition is met when the degree of change for any of said respective learning coefficients after updating thereof is less than a set value.

14. A method of producing reference patterns for improving the estimation precision in a speech recognition learning algorithm, the method comprising:

sampling data using respective learning coefficients corresponding to a plurality of sample groups to produce a respective reference pattern for each of said plurality of sample groups, said data having a series of features relating to speech recognition for each of said plurality of sample groups;

determining a respective measure of fitness between each of said sample groups and said respective reference pattern for each of said sample groups;

updating said learning coefficients based on said respective determined measure of fitness;

repetitively executing said sampling, said determining and said updating until a predetermined condition is met; and outputting at least one respective reference pattern for use in said speech recognition learning algorithm when said predetermined condition is met.

15. A method according to claim 14, wherein initial values of said learning coefficients are preset.

16. A method according to claim 14, wherein each of said respective measure of fitness is determined by a degree of similarity between each of said sample groups and said respective reference pattern for each of said sample groups.

17. A method according to claim 14, wherein each of said respective measure of fitness is determined by calculating a recognition rate between each of said sample groups and said respective reference pattern for each of said sample groups.

18. A method according to claim 14, wherein said respective learning coefficients are updated based on said respective determined measure of fitness such that a learning coefficient for a measure of fitness larger than an average measure of fitness is decreased and a learning coefficient for a measure of fitness smaller than said average measure of fitness is increased.

19. A method according to claim 14, wherein said predetermined condition is met when said learning coefficients are updated a set number of times.

20. A method according to claim 14, wherein said predetermined condition is met when the degree of change for any of said respective learning coefficients after updating thereof is less than a set value.

* * * * *